Patented Aug. 2, 1927.

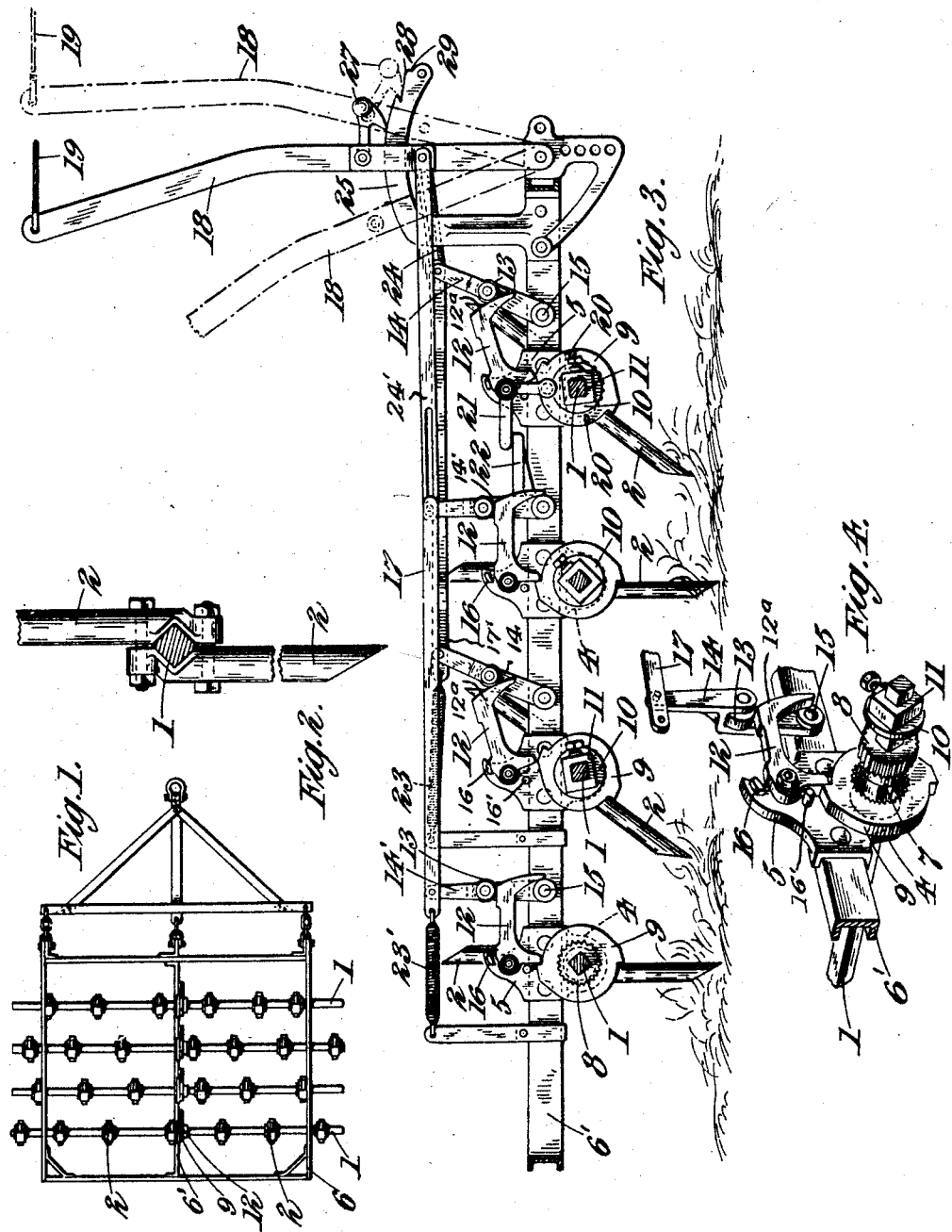

1,637,633

UNITED STATES PATENT OFFICE.

CECIL JOHN BUSWELL, OF WALLINGFORD, ENGLAND.

HARROW.

Application filed July 19, 1923, Serial No. 652,599, and in Great Britain July 24, 1922.

This invention relates to improvements in harrows of the type having pivoted tooth bars, said bars being maintained in rotary engagement with the frame of the harrow, the frame having a pivoted lever for actuating means which will release the tooth or tine bars from locked position, and when unlocked the bars will be turned by the forward movement of the frame.

The object of my invention is to provide a harrow with tooth carrying bars which are rotatably secured to the harrow frame, and also to provide means whereby the bars may be set so that each alternate bar may be released by appropriate mechanism without releasing the adjacent bars, the mechanism being of such construction that the bars may be thus actuated to release the bars altogether, or successively, in addition to the alternate release.

A further object of my invention consists in providing tooth bars with slidable bushings, a plate cam, means for holding the cam and bushing in separable engagement to admit of adjustment thereof relative to locking dogs or pawls and to position the teeth on the tooth bars so that the dogs may be actuated to time their disengagement from the cams, which disengagement is effected by the movement of lever actuated members.

A further object of my invention is to provide a lever which may be actuated by a pull upon a flexible connection with a locking pawl which engages a notch, and when moved by the lever beyond the notch, said pawl is adapted to jump the notch, said lever having associated therewith springs to effect movement of said lever in one direction.

My invention further comprises novel trip mechanism for controlling the movement of rotatable tine bars or shafts of harrows, said mechanism comprising a notched or stepped member mounted on the tine shaft and a pawl member normally in engagement therewith, the pawl member not being positively connected to the operating lever, but released through an intermediate lever of suitable shape. The pawl member may be of bell-crank form, one arm engaging the notched or stepped member and the other arm being normally held by a stop member acting against the direction of motion of the arm when released. Such stop member may be a roller carried by an intermediate lever pivoted to the frame of the machine, the swinging of the lever easily releasing the roller from the bell-crank arm and so releasing the dog or pawl.

In the preferred form of the invention, the notched or stepped member of the trip mechanism is provided, for instance, with a projection or lug, so as to actuate in its revolution, a bell-crank lever which trips the dog or pawl of the trip mechanism of the next succeeding row of tines. Special mechanism for altering the operative angle of the tines is also provided.

Other details of construction will be set forth more fully with reference to the accompanying drawings, which show by way of example, a constructional form of the invention, and in which:—

Fig. 1 is a general plan view of the harrow frame, cross bar and draft attachment;

Fig. 2 is a detail view showing means for attaching tines to tine shafts;

Fig. 3 is a side elevation, showing the trip mechanisms for the rows of tines, and the manner in which they are actuated from a single operating lever; and Fig. 4 is a perspective view on a somewhat larger scale of one of the trip mechanisms.

Referring to Fig. 1 of the drawings, I have shown a rectangular frame which is adapted to have associated therewith a plurality of tine or tooth bar shafts 1, the tines or teeth extending in opposite directions from the shafts.

The front and rear bars of the frame are preferably of angle iron which are connected to longitudinal bars 6 and 6' by corner braces, the outer side bars extending forwardly to receive the cross bar of a draft rig, particularly when the harrow is to be drawn by a tractor.

The center bar of the harrow frame has attached thereto plates which are provided with depending portions 4 and upwardly extending portions 5. These plates are permanently secured to the center bar 6' and the depending portions thereof having therethrough openings which are of a greater diameter than the tine bars 1, and upon said tine bars are mounted bushings having a reduced portion 7 and a peripherally serrated and larger portion 8 which is adapted to engage with a serrated aperture of a cam plate 9, said cam plate being provided with diametrically opposite notches. Each of the tine bars 1 also carries in slidable engagement therewith a disk 10 and a rectangular collar 11 which is slidable upon the tine bar and the same serving to hold the bushing 7 and the cam plate 9 over the depending portion of a plate 5. The upper portion of the member 5 has pivoted thereto a dog 12 which is provided at one end with a depending portion for alternate engagement with the notches of the cam plate, and the dog is also provided with a depending portion having a curved face. The upper portion of the dog is provided with raised projections, the projection nearest the pivot or fulcrum of said dog being adapted to engage with a stop 16 which projects from the plate 5, and there is also present a stop 16' for limiting the movement of the dog in an opposite direction.

In advance of each of the members 5, the bar 6' has secured thereto a lever 14 having a roller 13 for engagement with the dog 12, such lever being secured to the bar 6' by a fulcrum pin 15.

The offset upper portions of the levers are adjustably connected to a bar 17.

The tines or teeth 2, shown by Fig. 2 are provided adjacent to one end with recesses and with laterally extending bosses which are adapted to embrace the tine bars 1, and beyond these bosses the tine bars are apertured to receive clamping bolts for connecting the tines to the tine bars.

In order to release the dogs or pawls 12, the levers 14 are pivoted to a connecting rod 17' which itself is actuated from an operating lever 18 against the action of a spring 23. In the case of a tractor-drawn machine, a cord 19 passes forward from the lever 18 to the tractor and in the case of a horse-drawn harrow it may be passed over a conveniently arranged pulley to reverse the direction and so back to the driver at the rear of the harrow.

It will be seen that by introducing the pawl 12, the effort to release the tines in order to allow them to turn is very small and the whole pressure, except that due to springs, is released at the point of contact between the members 9 and 12 before members 12 have moved, so that there is no wear on the stepped portions of the members 9. As the levers 14 are returned to their vertical positions by the spring 23, they automatically, by means of the rolling contact between the rollers 13 and cam surfaces 12$^a$ provided on the dogs or pawls 12, bring the latter into normal position.

In the arrangement shown in Fig. 3, the tines operate in alternate pairs, that is, the first and third rows together and the second and fourth rows together and so on. In order to operate any one row of tines from a preceding row, projections 20 may be provided on the foremost member 9 which, when a half revolution of the latter is nearly complete, contact with and operate a bell-crank lever 21, or equivalent member preferably pivoted on the same axis as the rear dog or pawl 12, one arm of the lever 21 acting upon a projecting arm 22 on any convenient one of the levers 14, thus actuating the levers 14 and releasing the dog or pawl of the tripping mechanism for the succeeding row of tines. The stop 16 between the arms of the rear bell-crank lever 12 is lengthened to act also as a stop to limit the movement of the member 21 in either direction.

In the arrangement as shown in Fig. 3 two connecting rods 17 and 17' are shown connected up by links to the single operating lever 18. Only four rows of tines are shown, but obviously more could be provided and if operated in pairs or alternate rows, only the two rods 17 and 17' are necessary, one connected up to the odd rows and one to the even rows. The rods 17 and 17' are actuated against the pull of springs 23 and 23' and pivoted links 24 and 24' are interposed, if required, in the connection to the lever 18 to allow for different positions as imposed by the swinging of the levers 14.

It is intended with such arrangement as shown in Fig. 3 to have three positions of the lever 18, which works over the usual quadrant 25. The first position is the left-hand position of rest when the tines are operating normally. The second position is as shown in full lines, the lever 18 being brought to this position for an instant and then released, being returned by the springs 23. In this case the rod 17' actuates the first and third levers 14 in both directions, the link 24' for the other rod being provided with a slot long enough to prevent the rod itself being operated until the lever 18 is past the middle position. In the full line position of the lever 18 shown in Fig. 3, the said rod is just in the position to be actuated, the end of the slot having been reached. Thus the odd rows of tines will be released first and in completing their half revolution will effect the tripping of the even rows by means of the projections 20 and bell-crank levers 21. The third position of the lever 18 is to the extreme right, the lever being held in this position by the dog 27 engaging in the notch shown. In this case both rods 17 and 17' are actuated practically simultaneously and all the rows of tines are set to rotate continuously and all together.

Special provision is made for releasing the lever 18 from its extreme rear position easily and quickly. Behind the notch in which the weighted dog 27 engages, a rounded portion 28 is formed and also a depression 29. Now when the lever 18 is to be released, it is pulled right back until the point of the dog 27 slips over the rounded portion 28 and into the depression 29. On the lever being released, the springs 23 pull it sharply back and the point of the dog is pulled sharply up the portion 28 and jumps or overrides before the operative end of the gravity pawl can descend the notch in the quadrant and the lever returns to its initial position.

It will be understood that the arrangement shown in Fig. 3 is only given by way of example, and it is obvious that other combinations or arrangements can be made by which the different positions of a single operating lever effects various methods of release of the tines, without departing from the spirit of the invention.

It will be observed that the harrow as described and illustrated is essentially a one-lever harrow and is operated by a single cord, and that as will have been appreciated, the release for the operating lever is not operated by a catch controlled by a small lever attached to the main lever, as is generally the case. The ordinary arrangement would require two cords, the second one being to release the catch.

At any suitable point each of the rotary tine bars may have teeth attached at right angles to the main set of teeth for the purpose of insuring full rotation of the tine bars to bring the notches of the plates in locking position. It will be further noted that the bars 17 and 17' are provided with springs and said springs pull upon the bars 17 and 17' to which the levers 14 are secured, and that the links 24 and 24' which are pivoted to the lever 18 at one end and to the bars 17 and 17' at their other end are slotted to provide a take-up for adjustable connection between the links and bars; also that the springs 23 and 23' are secured to fixed standards which project upward from the bar 6' of the frame.

I claim:

1. A harrow comprising a frame, a plurality of transverse tooth carrying bars journaled thereto, a central bar having hangers with openings of larger diameter than the diameter of the tooth carrying bars, bushings slidable upon the tooth carrying bars, cams adjustable upon a portion of the bushings, and means on the bar for holding the bushings in engagement with the hangers and the cams.

2. In a harrow a frame provided with a plurality of transverse and independently rotatable tine bars, a central bar, members attached to said central bar, said members having therethrough and below the plane of the central openings of greater diameter than the diameter of the tine bars, bushings mounted on the tine bars, cam plates maintained in adjustable relation by the bushings with the tine bars, means on the tine bars for adjusting and holding the cams in fixed position relative to the tine bars, dogs for holding the cams and tine bars against rotation, said dogs being pivoted to the members attached to the central bar, and levers for moving the dogs into and out of engagement with the cams.

3. A harrow comprising a frame, a plurality of tine bars mounted on the frame for independent rotation, notched cams on the tine bars, locking dogs pivoted to the frame for engagement with the cams, a hand operated lever pivoted to the frame, slotted connecting bars which engage the hand lever, oscillatory bars connected to the frame and to the slotted connecting bars for engagement with the locking dogs.

4. A harrow frame provided with parallel and independently rotatable tine bars, each tine bar having thereon a cam which is rotatable therewith, pawls pivoted for engagement with opposite notched portions of the cams, levers having anti-friction rollers, said levers being fulcrumed on the frame for actuating the said pawls, means for limiting the oscillation of the pawls, and spring actuated bars connected to the aforesaid levers and with a manually operated lever pivoted to the forward portion of the frame, the position of which controls the movement of the levers which engage with the pawls.

In witness whereof I have signed this specification.

CECIL JOHN BUSWELL.